United States Patent
Pantle

(10) Patent No.: US 6,259,999 B1
(45) Date of Patent: Jul. 10, 2001

(54) METHOD AND DEVICE FOR DETERMINING A VEHICLE INERTIAL POSITION

(75) Inventor: Markus Pantle, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/147,905

(22) PCT Filed: Mar. 13, 1998

(86) PCT No.: PCT/DE98/00739

§ 371 Date: Mar. 23, 1999

§ 102(e) Date: Mar. 23, 1999

(87) PCT Pub. No.: WO99/05004

PCT Pub. Date: Feb. 4, 1999

(30) Foreign Application Priority Data

Jul. 25, 1997 (DE) .............................. 197 32 081

(51) Int. Cl.⁷ .................................................. B60R 21/32
(52) U.S. Cl. ..................... 702/153; 701/38; 73/514.01
(58) Field of Search ..................... 702/153, 141; 73/514.01; 701/1, 36, 38

(56) References Cited

U.S. PATENT DOCUMENTS

| | | | | |
|---|---|---|---|---|
| Re. 36,122 | * | 3/1999 | Mattes et al. | 180/268 |
| 5,890,084 | * | 3/1999 | Halasz et al. | 701/45 |
| 5,928,300 | * | 7/1999 | Rogers et al. | 701/45 |
| 5,961,562 | * | 10/1999 | Iyoda | 701/45 |
| 6,002,975 | * | 12/1999 | Schiffmann et al. | 701/36 |
| 6,023,664 | * | 2/2000 | Bennet | 702/141 |
| 6,076,028 | * | 6/2000 | Donnelly et al. | 701/45 |
| 6,138,066 | * | 10/2000 | Guo et al. | 701/38 |
| 6,141,604 | * | 10/2000 | Mattes et al. | 701/1 |
| 6,170,594 | * | 1/2001 | Gilbert | 180/282 |
| 6,178,375 | * | 1/2001 | Breunig | 701/124 |

FOREIGN PATENT DOCUMENTS

| | | |
|---|---|---|
| 196 09 176 | 9/1997 | (DE) . |
| 196 09 717 | 9/1997 | (DE) . |
| 430 813 | 6/1991 | (EP) . |
| 709 256 | 5/1996 | (EP) . |
| 709 257 | 5/1996 | (EP) . |

* cited by examiner

*Primary Examiner*—Patrick Assouad
(74) *Attorney, Agent, or Firm*—Kenyon & Kenyon

(57) ABSTRACT

The inertial state can be determined independently of dynamic vehicle movements by measuring the accelerations of the vehicle in the direction of its longitudinal, transverse and vertical axes, by forming the magnitude of an acceleration vector resulting from the three acceleration components and comparing the magnitude of the acceleration vector through threshold decisions with a window that is delimited by a threshold lying above and a threshold lying below gravitational acceleration g. A current course angle of the vehicle with respect to its longitudinal axis and/or the current course angle with respect to its transverse axis is then determined only if the magnitude of the acceleration vector lies inside the window; otherwise, however, the previously determined course angles are retained.

6 Claims, 1 Drawing Sheet

METHOD AND DEVICE FOR DETERMINING A VEHICLE INERTIAL POSITION

FIELD OF THE INVENTION

The present invention relates to a method and arrangement for determining an inertial state of a vehicle.

BACKGROUND INFORMATION

German Patent Application No. 196 09 717 describes an arrangement for detecting roll-over occurrences in vehicles. In case roll-over of a vehicle occurs, all passenger protection devices installed in the vehicle must be triggered promptly, including, for example, roll bars, belt tighteners and various airbags. To enable prompt triggering of all of these protection devices, it must be detected as soon as possible whether rotations of the vehicle about its vertical axis, its longitudinal axis or its transverse axis lead to a roll-over. Incorrect decisions on a roll-over occurrence must be ruled out insofar as possible so that the restraint devices are not triggered when, for example, the vehicle is on a steep slope or undergoes slow rotational occurrences during travel through curves. To prevent incorrect decisions from occurring in the roll-over sensing, the inertial state, i.e., the initial state of the vehicle relative to the earth-based coordinate system, must be known. Dynamic vehicle movements such as travel through curves or braking or acceleration procedures can have disruptive effects in determining the inertial state.

SUMMARY OF THE INVENTION

An object of the invention is to specify a method and an arrangement for determining the inertial state of a vehicle, disruptive effects due to dynamic vehicle movements being ruled out to the greatest possible extent.

Initially, the accelerations of the vehicle in the direction of its longitudinal, transverse and vertical axes are measured. Then, the magnitude of an acceleration vector resulting from the three acceleration components is formed and this magnitude is compared through threshold decisions with a window that is delimited by a threshold lying above and a threshold lying below the gravitational acceleration. The current positional angle of the vehicle with respect to its longitudinal axis and/or the current course angle with respect to its transverse axis is then determined only if the magnitude of the acceleration vector lies inside the window. However, if the magnitude of the acceleration vector lies outside the window, then a previously determined course angle with respect to the longitudinal axis and/or course angle with respect to the transverse axis is retained.

In this method or rather a corresponding arrangement for carrying out this method, dynamic acceleration components of the vehicle are ruled out with the aid of the window function when determining the inertial state. The course angles of the inertial state can then be correctly measured with the three acceleration sensors if the vehicle is either not moving at all or is moving uniformly. If the vehicle is subject to dynamic state changes, then no new current course angles are determined; instead, one falls back on previously determined course angles that are uninfluenced by dynamic position changes.

It is advantageous that the upper threshold of the window is about 10% greater and the lower threshold about 10% less than gravitational acceleration. Interfering quantities in determining the inertial state can be suppressed even more effectively if the threshold decisions are performed with respectively two acceleration vectors formed one after another in time. By forming the current course angle recursively from a component of a previously determined course angle and a component of the course angle derived from the currently measured accelerations, short-term disruptions can be suppressed very well in an advantageous manner.

Roll-over occurrences are very fast state changes of the vehicle that can be best detected with rate of rotation measurements. Based on the measured rates of rotation, the course angles are then derived through integration and it is decided based on these course angles whether a roll-over of the vehicle is occurring or not. So that dynamic vehicle movements uncritical to a roll-over occurrence do not also enter into the integration of the measured rates of rotation and the resulting course angles do not lead to an incorrect decision concerning a roll-over occurrence, it is useful to not begin integration of the rates of rotation prior to the availability of the inertial course angles derived according to the present invention.

DETAILED DESCRIPTION

Figure 1:
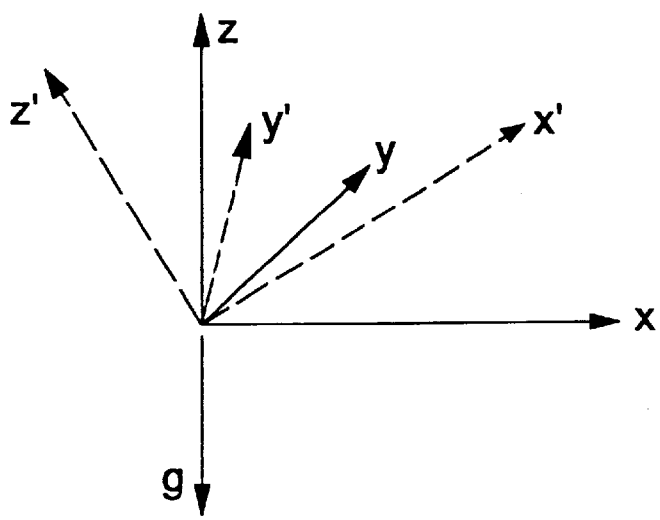
FIG. 1 shows an earth-based and a vehicle-based coordinate system.

In FIG. 1, an earth-based coordinate system x, y, z is sketched which is oriented such that gravitational acceleration g acts in the direction of the z axis. Also sketched in FIG. 1 is a vehicle-based coordinate system x', y', z' of a vehicle which exhibits a certain banking with respect to the earth-based coordinate system. In the vehicle-based coordinate system, x' is the longitudinal axis, y' the transverse axis and z' the vertical axis of the vehicle. In the vehicle, there are acceleration sensors which measure the acceleration components of the vehicle in the direction of its longitudinal axis x', its transverse axis y' and its vertical axis z'. Gravitational acceleration g is divided among the individual acceleration components ax', ay' and az' depending on the position of the vehicle-based coordinate system x', y', z'. If, due to dynamic vehicle movements, one or more further acceleration components are superimposed on gravitational acceleration g, it is no longer possible to determine error-free based on the measured acceleration components ax', ay' and az' the actual course angles of the vehicle relative to the earth-based coordinate system. As a general rule, the course angle φx, which is the rotational angle of the vehicle-based coordinate system about the x axis of the earth-based coordinate system, and the course angle φy, which is the rotational angle of the vehicle-based coordinate system about the y axis of the earth-based coordinate system, are needed to characterize the inertial state of the vehicle. As will be explained based on FIG. 1, the two course angles φx and φy can be derived using trigonometric functions from the acceleration components ax', ay' and az' and gravitational acceleration g. If interfering quantities due to dynamic vehicle movements are now superimposed on the acceleration components ax', ay', az', this leads to corrupted course angles φx and φy of the vehicle.

Figure 2:
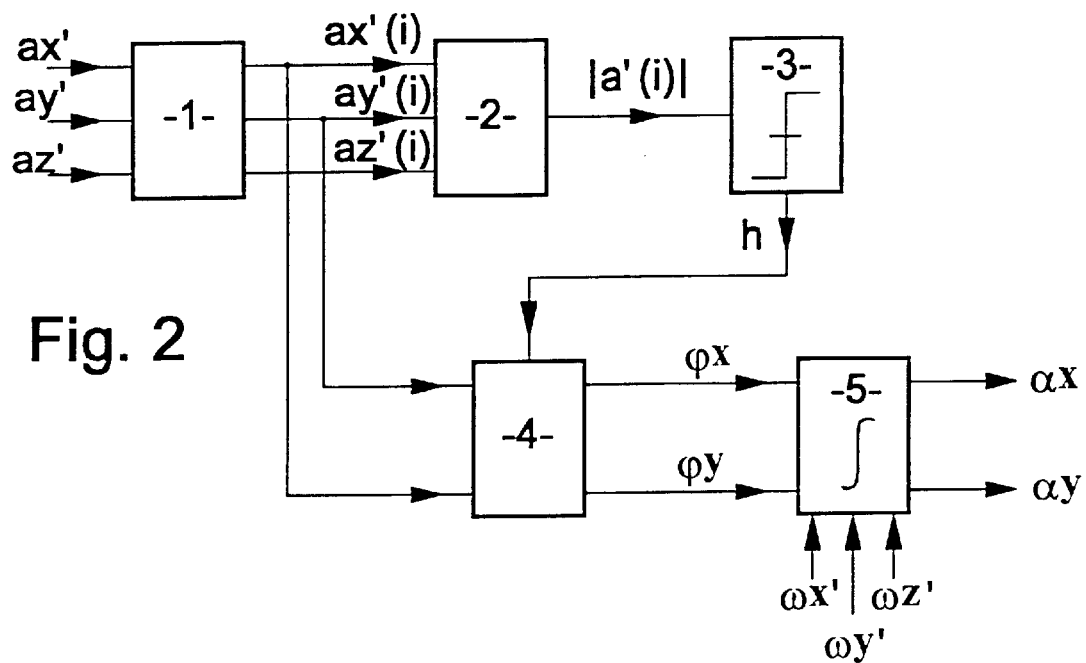
FIG. 2 shows a functional diagram for deriving the inertial state of the vehicle according to the present invention.

Based on the functional diagram shown in FIG. 2, a method will now be described for determining, based on the acceleration components ax', ay' and az' measured in the vehicle, the course angles φx and φy, which are uninfluenced to the greatest possible extent by interfering quantities due to dynamic vehicle movements. In functional block 1, the measured acceleration components ax', ay' and az' are subjected to filtering. The filtering serves to filter out small disturbances of the individual acceleration components. A suitable filter is, e.g., a median filter or some other digital filter with a low-pass characteristic. In a median filter, each acceleration component ax', ay', az' is sampled over a certain time interval and all of the sampled values are subdivided into several data tupels. For each data tupel, the average sampled value is determined. Assuming there are i data tupels from each acceleration component ax', ay' and az', the filtered acceleration components ax'(i), ay'(i) and az'(i) are present at the outputs of the filter 1.

In the second functional block 2, a resulting acceleration vector is formed from the filtered acceleration components ax'(i), ay'(i) and az'(i) and from this the magnitude:

$$|a'(i)| = \sqrt{ax'(i)^2 + ay'(i)^2 + az'(i)^2} \quad (1)$$

Figure 3:
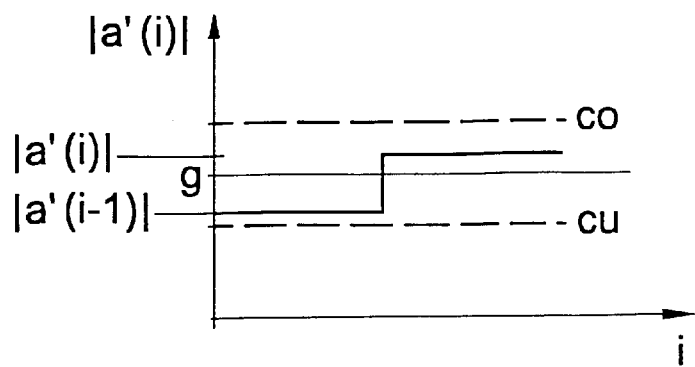
FIG. 3 shows a window function.

In connection block 3, the magnitude of the acceleration vector $|a'(i)|$ is subjected to a threshold decision. As shown in FIG. 3, a window function is involved here. This window has an upper threshold co and a lower threshold cu. The upper threshold co is about 10% greater than gravitational acceleration g and the lower threshold cu about 10% less than gravitational acceleration g. With this window function, it is thus determined whether the magnitude of the acceleration vector is equal more or less to that of gravitational acceleration g. If, namely, the magnitude of the acceleration vector deviates by a certain degree, which is specified by the thresholds co and cu, from gravitational acceleration g, then one must assume that the acceleration components ax', ay' and az' measured in the vehicle have interfering components superimposed on them due to dynamic vehicle movements. Diagram block 3 sets its output signal h to 1 if the magnitude of the acceleration vector lies inside the window and sets its output signal h to 0 if the magnitude of the acceleration vector lies outside the window. One can also, as is shown in FIG. 3, observe respectively two acceleration vectors present one after another in time on diagram block 3 with regard to their position in the specified window. In other words, only if the magnitudes of the acceleration vectors present at instant i and at instant i—1 both lie inside the specified window, the signal h is set to 1, and otherwise to 0.

$$h = \begin{cases} 1, & \text{if } |a'(i)| \text{ and } |a'(i-1)| \text{ within the window} \\ 0 & \text{otherwise} \end{cases} \quad (2)$$

In functional block 4, the course angles $\phi x$ and $\phi y$ are derived with the aid of the computational procedure described hereafter from the acceleration components ax' and ay'. In equation (3), the trigonometric relationship between the acceleration components ax', ay', az' measured in the vehicle and the acceleration components with respect to the earth-based coordinate system x, y, z is shown. Since gravitational acceleration g acts only in the direction of the z axis of the earth-based coordinate system, acceleration ax and ay in the direction of the x axis and the y axis of the earth-based coordinate system are 0. Therefore:

$$\begin{bmatrix} ax' \\ ay' \\ az' \end{bmatrix} = \begin{bmatrix} \cos\varphi y & 0 & -\sin\varphi y \\ \sin\varphi x \sin\varphi y & \cos\varphi x & \sin\varphi x \cos\varphi y \\ \cos\varphi x \sin\varphi y & -\sin\varphi x & \cos\varphi x \cos\varphi y \end{bmatrix} \begin{bmatrix} 0 \\ 0 \\ -g \end{bmatrix} \quad (3)$$

-continued $$\begin{bmatrix} ax' \\ ay' \\ az' \end{bmatrix} = \begin{bmatrix} \sin\varphi y \\ -\sin\varphi x \cos\varphi y \\ -\cos\varphi x \cos\varphi y \end{bmatrix} \quad (4)$$

$$\varphi y = \arcsin\frac{ax'}{g} \quad (5)$$

$$\varphi x = -\arcsin\frac{ay'}{g\cos\varphi y} \quad (6)$$

If the window signal h=1, however, errors can still arise when computing the course angles if, e.g., a resulting vector from interfering accelerations and the gravitational acceleration coincidentally assumes a magnitude of 1 g. To prevent such an error from occurring, it is useful to compute each new course angle $\phi x_{new}$ and $\phi y_{new}$ recursively from a component of a course angle $\phi x_{old}$ and $\phi y_{old}$ computed earlier and a component of the course angles $\phi x$ and $\phi y$ derived from the currently measured accelerations:

$$\phi x_{new} = c1 \phi x_{old} + c2 \phi x \quad (7)$$

$$\phi y_{new} = c1 \phi y_{old} + c2 \phi y \quad (8)$$

The weighting factors c1 and c2 in the equations (7) and (8) must be determined experimentally. They lie between 0 and 1 and have low-pass properties.

In case roll-over occurrences of the vehicle are to be sensed, a functional block 5 is provided which determines the rotational angle $\alpha x$ and $\alpha y$ of the vehicle about the earth-based x and y axes by integrating measured rates of rotation $\omega x'$, $\omega y'$, $\omega z'$ about the longitudinal axis x', transverse axis y' and vertical axis z' of the vehicle. To prevent slight dynamic positional changes of the vehicle from also entering into the integration, the integration is begun with the previously determined course angles $\alpha x$ and $\alpha y$, the reason being that these course angles $\alpha x$ and $\alpha y$ are largely uninfluenced by disruptive dynamic vehicle movements (e.g., travel through curves, acceleration and braking processes).

What is claimed is:

1. A method for determining an inertial state of a vehicle, comprising the steps of:
   (a) measuring a first acceleration component of the vehicle in a first direction, a second acceleration component of the vehicle in a second direction and a third acceleration component of the vehicle in a third direction, the first direction extending along a longitudinal axis of the vehicle, the second direction extending along a transverse axis of the vehicle and the third direction extending along a vertical axis of the vehicle;
   (b) obtaining a magnitude of an acceleration vector of the vehicle as a function of the first, second and third acceleration components;
   (c) determining if the magnitude is within a predetermined threshold range using a threshold decision arrangement, the predetermined threshold range having an upper threshold value which is greater than a gravitational acceleration value and a lower threshold value which is less than the gravitational acceleration value;
   (d) only if the magnitude is within the predetermined threshold range, determining at least one of a first current course angle of the vehicle with respect to the longitudinal axis and a second current course angle of the vehicle with respect to the transverse axis; and
   (e) if the magnitude is outside of the predetermined threshold range, retaining at least one of a first previously determined course angle with respect to the longitudinal axis and a second previously determined course angle with respect to the transverse axis.

2. The method according to claim 1, wherein the upper threshold value is approximately 10% greater than the gravitational acceleration value and the lower threshold value is approximately 10% less than the gravitational acceleration value.

3. The method according to claim 1, wherein step (c) includes the substep of determining if a further magnitude of a further acceleration vector is within the predetermined threshold range using the threshold decision arrangement, the further acceleration vector being formed before the acceleration vector, and wherein step (d) includes the substep of determining at least one of the first current course angle and the second current course angle if the magnitude and the further magnitude are within the predetermined threshold range.

4. The method according to claim 1, further comprising the steps of:

(f) determining a first corresponding component of the first and second current course angles as a function of the first, second and third acceleration components;

(g) determining a second corresponding component of at least one of the first and second previously determined course angles; and (h) recursively determining at least one of the first and second current course angles as a function of the first and second corresponding components.

5. The method according to claim 1, further comprising the step of:

(i) determining at least one of a first rotational angle with respect to the longitudinal axis and a second rotational angle with respect to the transverse axis as a function of an integration of at least one measured rate of rotation, wherein the integration is performed using at least one of the first current course angle, the second current course angle, the first previously determined course angle, and the second previously determined course angle.

6. An arrangement for determining an inertial state of a vehicle, comprising:

acceleration sensors measuring a first acceleration component of the vehicle in a first direction, a second acceleration component of the vehicle in a second direction and a third acceleration component of the vehicle in a third direction, the first direction extending along a longitudinal axis of the vehicle, the second direction extending along a transverse axis of the vehicle and the third direction extending along a vertical axis of the vehicle;

a first arrangement determining a magnitude of an acceleration vector as a function of the first, second and third acceleration components;

a second arrangement determining if the magnitude is within a predetermined threshold range, the predetermined threshold range having an upper threshold value which is greater than a gravitational acceleration value and a lower threshold value which is less than the gravitational acceleration value; and a third arrangement determining at least one of a first current course angle of the vehicle with respect to the longitudinal axis and the second current course angle of the vehicle with respect to the transverse axis only if the magnitude is within the predetermined threshold range, wherein, if the magnitude is outside of the predetermined threshold range, then at least one of a first previously determined course angle with respect to the longitudinal axis and a second previously determined course angle with respect to the transverse axis is retained.

* * * * *

UNITED STATES PATENT AND TRADEMARK OFFICE
CERTIFICATE OF CORRECTION

PATENT NO.      : 6,259,999 B1                               Page 1 of 1
DATED           : July 10, 2001
INVENTOR(S)     : Pantle, Markus It is certified that error appears in the above-identified patent and that said Letters Patent is hereby corrected as shown below:

<u>Column 1,</u>
Line 1, change "method and device…" to -- method and arrangement… --

Signed and Sealed this

Twenty-first Day of January, 2003

JAMES E. ROGAN
*Director of the United States Patent and Trademark Office*